United States Patent
Huijzer

(10) Patent No.: US 7,243,555 B2
(45) Date of Patent: Jul. 17, 2007

(54) TRANSMITTING AND RECEIVING CIRCUITRY FOR AN ULTRASONIC FLOWMETER, AND METHOD FOR OPERATING SUCH TRANSMITTING AND RECEIVING CIRCUITRY

(75) Inventor: Arie Huijzer, Sliedrecht (NL)

(73) Assignee: Krohne AG, Basel (CH)

( * ) Notice: Subject to any disclaimer, the term of this patent is extended or adjusted under 35 U.S.C. 154(b) by 165 days.

(21) Appl. No.: 11/139,740

(22) Filed: May 27, 2005

(65) Prior Publication Data

US 2007/0006665 A1    Jan. 11, 2007

(30) Foreign Application Priority Data

May 27, 2004    (DE) .................... 10 2004 026 556

(51) Int. Cl.
*G01F 1/66*    (2006.01)
(52) U.S. Cl. .................................. 73/861.27
(58) Field of Classification Search ............ 73/861.29, 73/861.27, 861.31, 861.25, 861.26; 702/45, 702/48, 54; 367/140, 87; 267/191
See application file for complete search history.

(56) References Cited

U.S. PATENT DOCUMENTS 6,584,861 B1    7/2003    Jespersen 6,947,851 B2 *    9/2005    Jespersen ................. 702/45
2005/0061085 A1    3/2005    Jesperson

FOREIGN PATENT DOCUMENTS

JP    02174837    7/1990

OTHER PUBLICATIONS

European Search Report, European Patent Office, Jun. 7, 2006.

* cited by examiner

*Primary Examiner*—Jewel Thompson
(74) *Attorney, Agent, or Firm*—John F. McKenna; Cesari & McKenna, LLP

(57) ABSTRACT

A transmitting and receiving circuitry system for an ultrasonic flowmeter includes an ultrasound transducer interface for connection to an ultrasound transducer of the ultrasonic flowmeter, an amplifier with a first input and a second input, as well as a signal generator for activating the ultrasound transducer, with the first input of the amplifier connecting to the signal generator while the second input of the amplifier connects both to the ultrasound transducer interface and, via a feedback element, to the output of the amplifier. The impedance of the feedback element can be varied, permitting an adaptation of the transmitting and receiving circuitry to the operating mode of the ultrasonic flowmeter, in particular an adaptation to a transmitting or receiving mode, whereby an overall improvement of the signal-to-noise ratio is attainable. A method for operating such a system is also disclosed.

9 Claims, 3 Drawing Sheets

TRANSMITTING AND RECEIVING CIRCUITRY FOR AN ULTRASONIC FLOWMETER, AND METHOD FOR OPERATING SUCH TRANSMITTING AND RECEIVING CIRCUITRY

BACKGROUND OF THE INVENTION

This invention relates to a transmitting and receiving circuitry system for an ultrasonic flowmeter, with an ultrasound transducer interface for connection to an ultrasound transducer of the ultrasonic flowmeter, an amplifier with a first input and a second input, as well as a signal generator for activating the ultrasound transducer, with the first input of the amplifier connecting to the signal generator while the second input of the amplifier is connected to both the ultrasound transducer interface and, via a feedback element, to the output of the amplifier. The invention further relates to an ultrasonic flowmeter employing such transmitting and receiving circuitry and to a method for operating such transmitting and receiving circuitry.

In the operation of ultrasonic flowmeters, ultrasound waves are used for measuring the speed and flow rate of a fluid medium traveling through a measuring tube. The parameters that can be derived from the flow of the medium include, for instance, runtime differences, frequency changes and phase shifts. To that effect, ultrasound transducers transmit ultrasonic waves, in continuous or pulsed fashion, into the flowing medium and receive the reflected signals. The principles on which ultrasonic flow measurements are based essentially consist, for one, of the so-called pulling effect whereby the propagation speed of the ultrasonic waves changes as these waves are carried along by the flowing medium, and, for another, of the Doppler effect that changes the frequency as the transmitter and the receiver move relative to each other.

An ultrasonic flowmeter is usually equipped with two ultrasound transducers which are offset relative to each other in the flow direction and which can alternate between a transmitting and a receiving mode, allowing the ultrasonic waves that were transmitted by one ultrasound transducer and have traveled through the flowing medium over a certain distance to be received by the other ultrasound transducers.

As will be evident from what has been said above, a transmitting and receiving circuitry system for an ultrasonic flowmeter, meaning circuitry that must be capable of handling the transmitting as well as receiving operation of the ultrasonic flowmeter, must meet certain requirements. In particular, transmitting and receiving circuitry of that type must ensure appropriate performance, stability and an acceptable signal-to-noise ratio in both the transmitting and receiving modes. The problem lies in the fact that, to some extent, transmission and reception involve altogether different requirements for the circuitry system insofar as, in the transmission mode, the signal generator generates a voltage signal that is fed to an ultrasound transducer, enabling the latter to send ultrasonic waves into the flowing medium, whereas in the receiving mode no ultrasonic signal is generated and emitted, yet the best possible reception of an ultrasonic signal must be assured.

Conventional transmitting and receiving circuitry systems for ultrasonic flowmeters do not adequately address this problem. In particular, they fail to attain a satisfactory signal-to-noise ratio.

SUMMARY OF THE INVENTION

It is therefore the objective of this invention to introduce a transmitting and receiving circuitry system for an ultrasonic flowmeter, and a method for operating such transmitting and receiving circuitry, by means of which a good signal-to-noise ratio is attainable.

For a transmitting and receiving circuitry system as described above, this objective is achieved by the ability to vary the impedance of the feedback element.

In the development of this invention, it was discovered that the performance of the transmitting and receiving circuitry and especially the signal-to-noise ratio can be significantly improved by adapting the impedance of the feedback element to the different operating modes of the transmitting and receiving circuitry. In the transmitting mode in which the signal generator generates voltage signals and sends these to the ultrasound transducer that is connected to the ultrasound transducer port, the impedance of the feedback element is advantageously reduced to a relatively low value to achieve optimal transmission performance. In the receiving mode, on the other hand, the impedance of the feedback element is advantageously increased to a higher value since an augmentation of the impedance of the feedback element is accompanied by a correspondingly greater gain factor.

It is further possible to operate the system in a reflectance mode in which the signal generator generates a voltage signal and sends it to the ultrasound transducer. However, this mode is not intended for measuring operations but rather for testing purposes in the course of which it is possible, for instance, to determine the propagation time in an ultrasonic waveguide installed in the ultrasonic flowmeter, to ascertain whether all transducers and cables are properly connected, to check the performance parameters of the transducers or to verify that a signal reflected by the medium flowing through the measuring tube is received. While in the reflectance mode, the signal generator generates and delivers a voltage signal, and the transmitting and receiving circuitry must capture and process the reflected signal. Accordingly, is desirable in the reflectance mode to work with a higher impedance of the feedback element.

Variability of the impedance of the feedback element can be achieved in different ways. One preferred embodiment of the invention employs a selector unit for controlling the impedance of the feedback element. Specifically, in a preferred embodiment of the invention an electric switch, an electric potentiometer or a photoelectric coupler can serve as the feedback element. The feedback element is so designed as to permit the selection of a relatively low impedance in the transmitting mode, a comparably higher impedance in the receiving mode and again a higher impedance in the reflectance mode.

As an alternative to a selector unit for the feedback element, the feedback element may be in the form of a nonlinear device. The nonlinear device serving as the feedback element is preferably designed in a way whereby a signal received via the ultrasound transducer port produces a higher impedance and a signal generated by the signal generator produces a lower impedance. The nonlinear device therefore does not require any control provisions because, due to its design, the nonlinear device automatically produces different impedances between states where in the transmitting mode no signal is received but a voltage signal is sent while in the receiving mode a signal is received but no voltage signal is generated and sent.

In a preferred embodiment of the invention, the nonlinear device may be a circuit with diodes and at least one resistor. Especially preferred is a circuit configuration incorporating a resistor parallel-connected to a pair of mutually opposite, parallel-connected diodes.

Finally, in a preferred embodiment of the invention, the amplifier is provided with a non-inverting input and an inverting input, with the noninverting input serving as the first input and the inverting input as the second input.

The above method for operating the transmitting and receiving circuitry of an ultrasonic flowmeter that achieves the aforementioned objective is characterized in that the impedance of the feedback element is selectively controlled.

According to the invention, the impedance of the feedback element is controlled by active intervention when there is no feedback element such as the nonlinear device referred to above that automatically selects a different impedance for the transmitting mode and, respectively, for the receiving mode.

In a preferred embodiment of my method for operating a transmitting and receiving circuitry system, the transmitting and receiving circuitry alternates between transmission and reception, whereby in the transmitting mode the signal generator feeds a signal to the ultrasound transducer and the impedance of the feedback element is adjusted to a low value, while in the receiving mode no signal is fed to the ultrasound transducer and the impedance of the feedback element is adjusted to a higher value.

In a preferred embodiment of the invention and as an alternative to the transmitting and the receiving mode, the transmitting and receiving circuitry can also be operated in a reflectance mode in which the signal generator feeds a signal to the ultrasound transducer and the impedance of the feedback element is adjusted to a higher value.

Overall, the invention permits enhanced operation of the ultrasonic flowmeter since the same input and output impedance can be attained in all operating modes. Moreover, it offers numerous possibilities for configuring and expanding the transmitting and receiving circuitry according to the invention as well as a novel method for operating the transmitting and receiving circuitry. In that context, attention is invited to the dependent claims and to the following detailed description of preferred embodiments of the invention, with reference to the drawings.

DETAILED DESCRIPTION OF AN ILLUSTRATIVE EMBODIMENT

Figure 1:
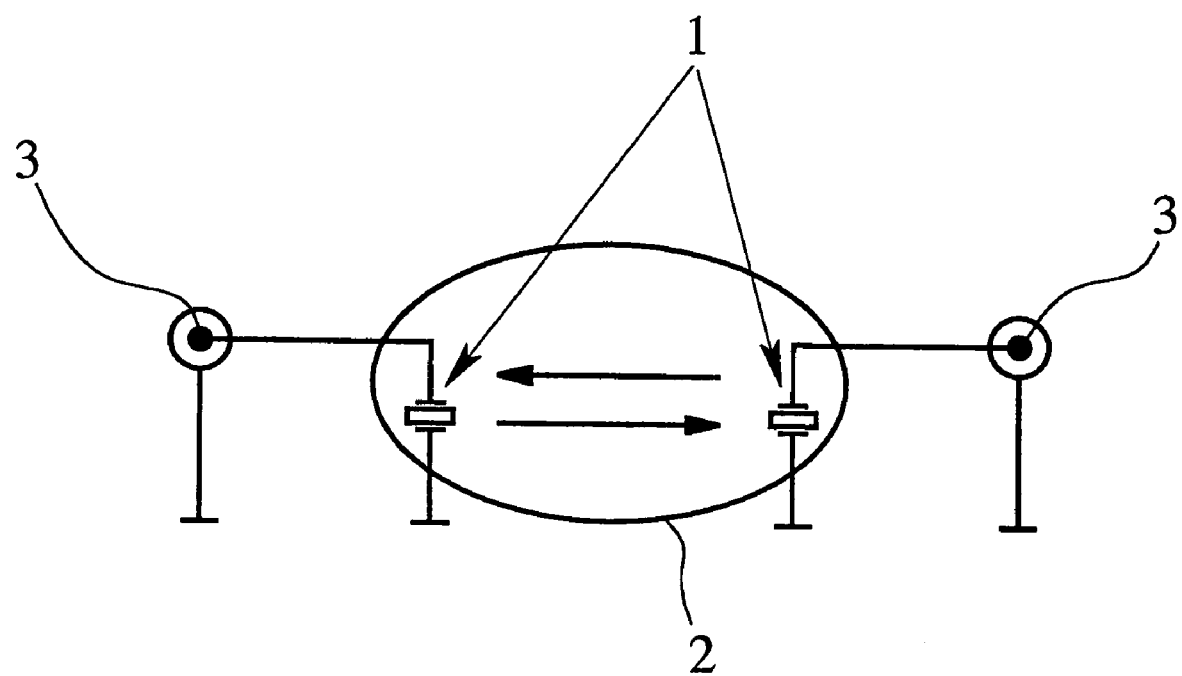
FIG. 1 is a schematic outline showing the principle of an ultrasonic flowmeter with two ultrasound transducers and their connecting ports.

FIG. 1 shows in skeletonized schematic fashion the conceptual principle of an ultrasonic flowmeter. It includes two ultrasound transducers 1, positioned in a mutually off-set arrangement in a measuring tube 2 through which flows a fluid medium. The illustration in FIG. 1 corresponds to a cross section through a cylindrical measuring tube 2, with the sectional plane defined by the two ultrasound transducers 1 and extending at a 90° angle relative to the longitudinal axis of the measuring tube 2 and thus to the flow direction of the medium traveling through the measuring tube 2.

The two ultrasound transducers 1 are each provided with a connecting port 3 for connection to a transmitting and receiving circuitry system. The following describes transmitting and receiving circuitry systems according to preferred embodiments of the invention that can be connected to these ports 3.

Figure 2:
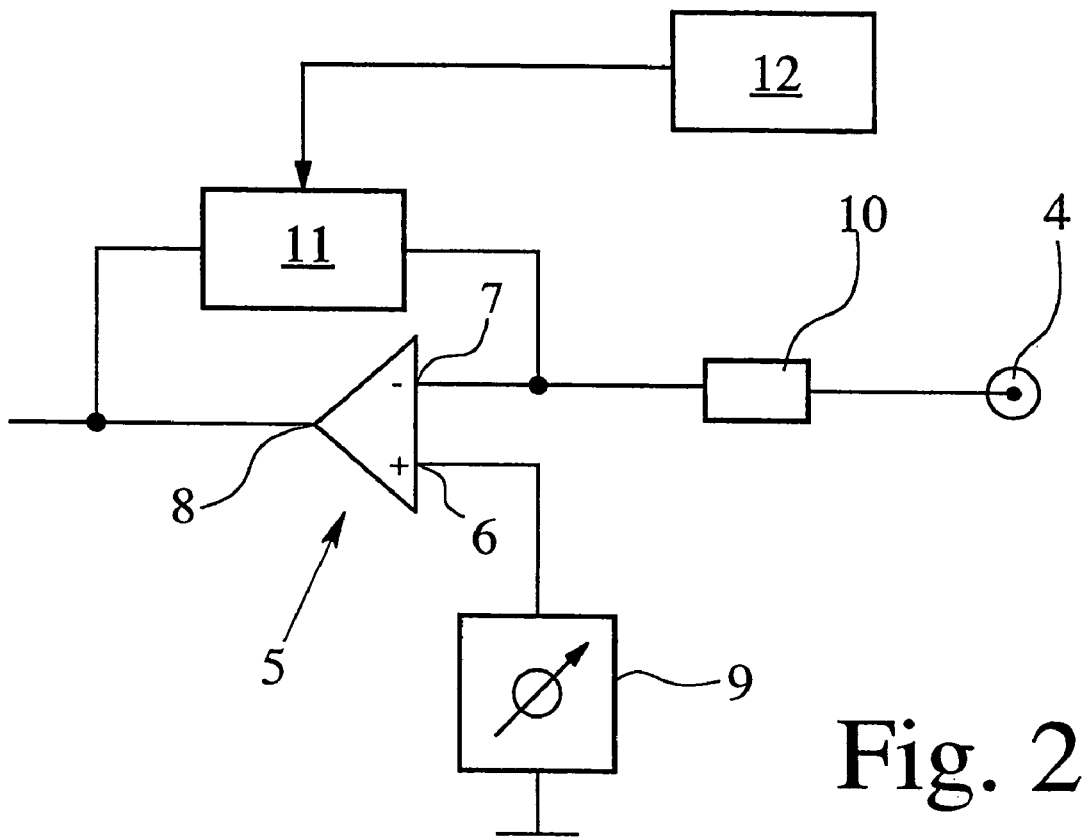
FIG. 2 is a schematic outline of a transmitting and receiving circuitry system for an ultrasonic flowmeter according to a first preferred embodiment of the invention.

FIG. 2 shows a transmitting and receiving circuitry design for an ultrasonic flowmeter according to a first preferred embodiment of the invention. It includes an ultrasound transducer interface 4 to which an ultrasound transducer 1 can be connected via its port 3. Also provided is an operational amplifier 5 with a first, noninverting input 6 and a second, inverting input 7 as well as an output 8. The noninverting input 6 of the operational amplifier 5 connects to a signal generator 9 which in the transmitting mode and in the reflectance mode of the ultrasonic flowmeter generates and sends voltage signals. The noninverting input 7 of the operational amplifier 5 connects via a resistor 10 to the ultrasound transducer interface 4 and, via a feedback element 11, to the output 8 of the operational amplifier 5.

The feedback element 11 in this case is of a design that permits the selection of its impedance. Thus, the feedback element 11 may be, for example, an electric switch, an electric potentiometer or a photoelectric coupler. A selector unit 12 serves to selectively control the feedback element 11 as described below:

In the transmitting mode in which the signal generator 9 generates and sends voltage signals so as to enable the ultrasound transducer 1 to inject ultrasound signals into the flowing medium, the selector unit 12 controls the impedance of the feedback element 11 in a manner whereby the impedance drops to a lower value, permitting maximum transmission output performance. But in the receiving mode of the ultrasonic flowmeter in which the signal generator 9 does not generate and send any voltage signals and the only aspect of importance is the reception and amplification of a signal detected by the ultrasound transducer 1, the selector unit 12 adjusts the impedance of the feedback element 11 to a higher value. As the impedance of the feedback element 11 is augmented, the gain of the operational amplifier 5 is increased to a point where a strong signal and thus an improved signal-to-noise ratio is obtained.

Finally, it is possible to operate the system in a so-called reflectance mode in which the signal generator 9 generates a voltage signal and sends it to the ultrasound transducer 1, although that mode is not intended for measuring but for testing purposes, whereby for instance the propagation time in an ultrasound waveguide, installed in the ultrasonic flowmeter, can be determined as described further above. This concept provides for the signal generator 9 to generate and send voltage signals so as to allow for reflected signals to be measured, with appropriate capture and amplification of the retroreflected signals made possible in that the selector unit 12 controls the feedback element 11 in a way as to adjust its impedance to a higher level, for the reasons already described in connection with the receiving mode.

Figure 3:
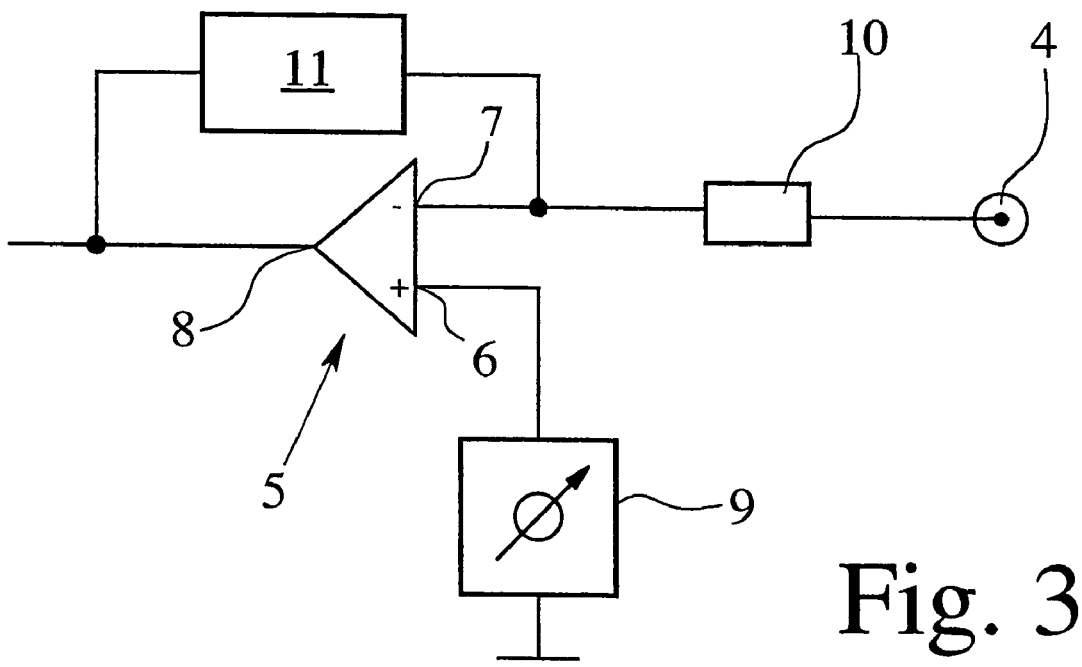
FIG. 3 a schematic outline of a transmitting and receiving circuitry system for an ultrasonic flowmeter according to a second preferred embodiment of the invention.

FIG. 3 depicts a transmitting and receiving circuitry system for an ultrasonic flowmeter according to a second preferred embodiment of the invention. This transmitting and receiving circuitry is essentially identical to that illustrated in FIG. 2 for the first preferred embodiment of the invention except that no selector unit 12 is provided for controlling the feedback element 11. No such selector unit is needed since the feedback element 11 in the second embodiment of the invention is in the form of a nonlinear device.

Figure 4:
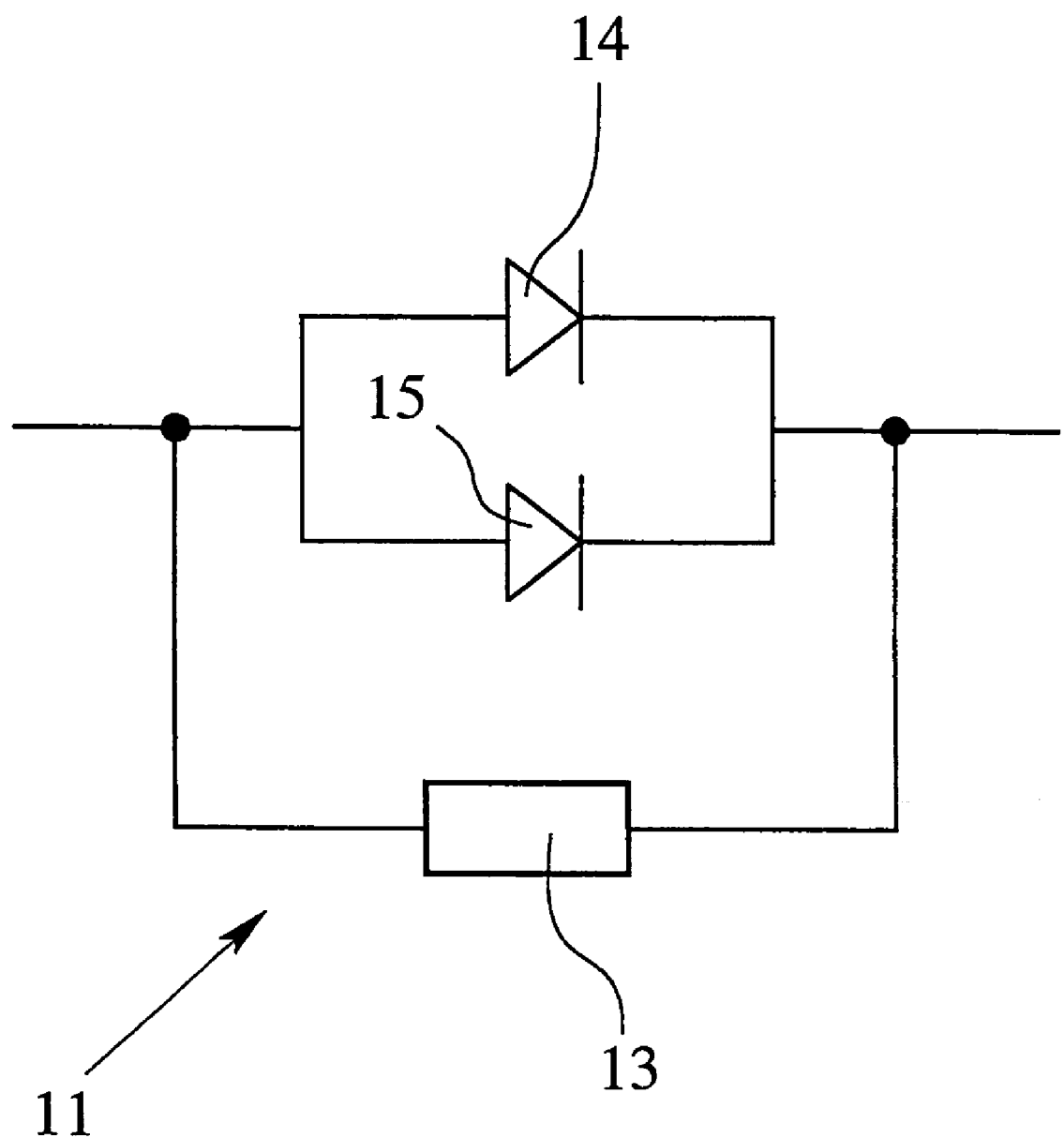
FIG. 4 illustrates an example of a nonlinear device constituting the feedback element for the transmitting and receiving circuitry according to the second preferred embodiment of the invention.

Specifically, the feedback element 11 is designed as a nonlinear device as shown in FIG. 4. The configuration of a pair of parallel-connected, mutually opposite diodes 14, 15 in parallel connection with a resistor 13 constitutes a nonlinear device that "sees" a higher impedance when a signal is detected via the ultrasound transducer interface 4, and a lower impedance when a signal is generated by the signal generator 9. The resistor 13 and the diodes 14 and 15 are dimensioned for a compromise solution in the reflectance mode assuring adequate transmission power and a gain factor that is still satisfactory.

What is claimed is:

1. Transmitting and receiving circuitry for an ultrasonic flowmeter having an ultrasound transducer, said circuitry comprising
    an interface for connection to the ultrasound transducer;
    an amplifier having a first input and a second input, and a signal generator for activating the ultrasound transducer, said first input of the amplifier being connected to the signal generator, said second input of the amplifier being connected both to the ultrasound transducer interface and, via a feedback element, to the output of the amplifier, and said feedback element having an impedance which can be varied in such a way that the impedance is higher when a signal is detected via the ultrasound transducer interface and that the impedance is lower when a signal is generated by the signal generator.

2. The transmitting and receiving circuitry as in claim 1, including a selector unit for selectively controlling the impedance of the feedback element.

3. The transmitting and receiving circuitry as in claim 2, wherein the feedback element is selected from the group consisting of an electric switch, an electric potentiometer and a photoelectric coupler.

4. The transmitting and receiving circuitry as in claim 1, wherein the feedback element is a nonlinear device.

5. The transmitting and receiving circuitry as in claim 4, wherein the nonlinear device is a circuit comprising at least one resistor and two diodes.

6. The transmitting and receiving circuitry as in one of the claims 1 to 5, wherein the amplifier has a noninverting input and an inverting input, the noninverting input constituting said first input and the inverting input constituting said second input.

7. An ultrasonic flowmeter incorporating transmitting and receiving circuitry as in claim 1 or 2.

8. A method for operating a transmitting and receiving circuitry system of an ultrasonic flowmeter that includes an ultrasound transducer interface connected to an ultrasound transducer of the ultrasonic flowmeter, an amplifier with a first input and a second input, and a signal generator, where the first input of the amplifier connects to the signal generator while the second input of the amplifier connects both to the ultrasound transducer interface and, via a feedback element, to the output of the amplifier, and the ultrasound transducer is activated by the signal generator, said method comprising selectively controlling the impedance of the feedback element, wherein the transmitting and receiving circuitry system alternates between a transmitting mode wherein the signal generator feeds a voltage signal to the ultrasound transducer causing the impedance of the feedback element to be adjusted to a lower value, and a receiving mode wherein no voltage signal is sent to the ultrasound transducer and the impedance of the feedback element is adjusted to a higher value.

9. The method as in claim 8, wherein, as an alternative to the transmitting and receiving modes, the transmitting and receiving circuitry system is operated in a reflectance mode in which the signal generator feeds a voltage signal to the ultrasound transducer and the impedance of the feedback element is adjusted to a higher value.

* * * * *